March 15, 1960 J. H. MYER 2,928,950
POINT-CONTACT SEMICONDUCTOR PHOTOCELL
Filed April 5, 1955 5 Sheets-Sheet 1

JON H. MYER
INVENTOR.
BY Henry Heyman
ATTORNEY

JON H. MYER
INVENTOR.

BY Henry Heyman

ATTORNEY

POINT-CONTACT SEMICONDUCTOR PHOTOCELL

Filed April 5, 1955 5 Sheets-Sheet 3

JON H. MYER
INVENTOR.

BY Henry Heyman

ATTORNEY

JON H. MYER
INVENTOR.

BY Henry Heyman
ATTORNEY

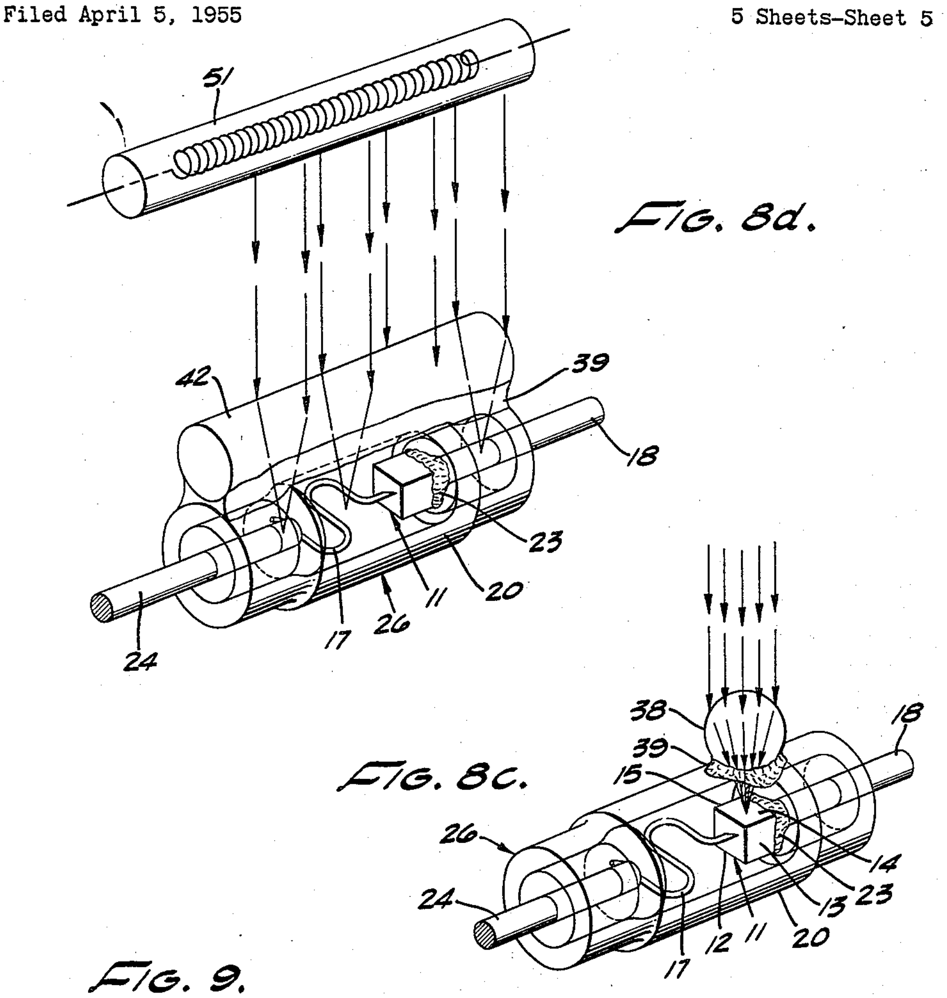
FIG. 8d. FIG. 8c.
FIG. 9.
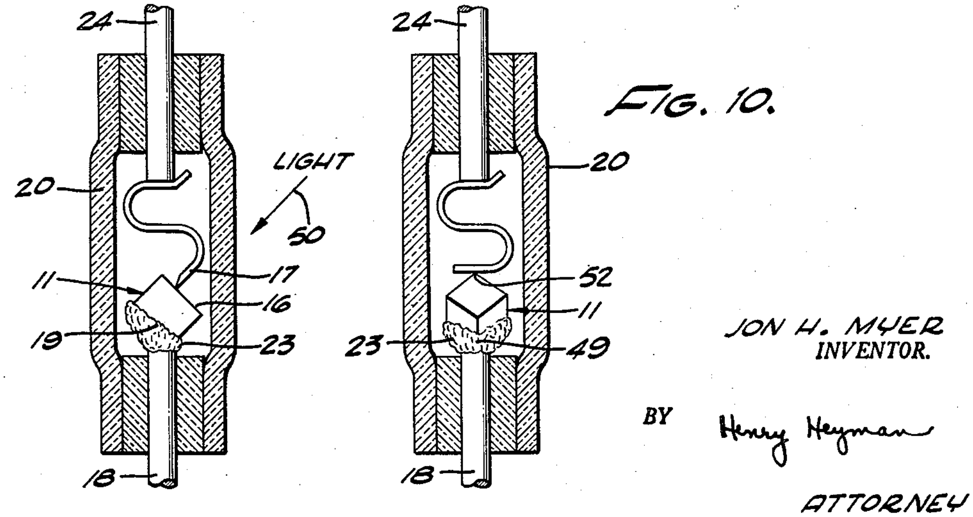
FIG. 10.
JON H. MYER
INVENTOR.
BY Henry Heyman
ATTORNEY 2,928,950

POINT-CONTACT SEMICONDUCTOR PHOTOCELL

Jon H. Myer, Los Angeles, Calif., assignor to Hughes Aircraft Company, Culver City, Calif., a corporation of Delaware Application April 5, 1955, Serial No. 499,292

7 Claims. (Cl. 250—211)

This present invention relates to photocells and more particularly to point-contact semiconductor photocells.

Photocells are usually divided into two distinct classes, one type being a photoelectric cell and the other a photoconductive cell. The device of the present invention may alternately be used as either a photoelectric or photoconductive cell, depending upon the external conditions established. A photoelectric cell will generate a current in a closed electrical circuit which is proportional to the intensity of the radiant energy received by the cell. On the other hand, a photoconductive photocell will change its electrical resistance with illumination and as it has nonlinear characteristics it will rectify an applied A.C. signal. The photoelectric or photoconductive phenomenon occurring in a semiconductor point-contact photocell may be explained in relatively simple terms, while a rigorous treatment of the subject requires quantum mechanics, calculations and equations. It might further be added that much is yet left to be discovered and explained in the field of semi-conductors in general and semiconductor photocells in particular. The simple explanation to follow requires a familiarity with the terms relating to semiconductors defined in the October, 1954 issue of "Proceedings of the IRE," pages 1506 through 1508.

Semiconductors, such as germanium, silicon, germanium-slicon alloy, indium-antimonite, aluminum-antimonite, gallium-antimonite, indium-arsenite, aluminum-arsenite, gallium-arsenite, lead-sulfide, lead-telluride, lead-selenide, cadmium-sulfide, cadmium-telluride, cadmium-selenide, or others hereinafter to be discussed, have been found to be extremely useful in electrical devices for translating electromagnetic energy, such as light or radiant energy for the generation or control of electric currents. In particular, these semiconductor devices have been utilized for sensing light and other forms of radiant energy and for amplifying or rectifying electrical input signals.

Basic to the theory of operation of semiconductor devices is the concept that current may be carried in two distinctly different manners; namely, "conduction by electrons" or "excess electron conduction," and "conduction by holes," or "deficit electron conduction." The fact that electrical conductivity by both of these processes may occur simultaneously and separably in a semiconductor specimen affords a basis for explaining the electrical behavior of semiconductor devices. One manner in which the conductivity of a semiconductor specimen may be established is by the addition of "active impurities" to the base semiconductor material.

In the semiconductor art, the term "active impurities" is used to denote those impurities which affect the elecrical characteristics of a semiconductor material as distinguished from other impurities which have no appreciable effect upon these characteristics. Generally, active impurities are added intentionally to the semiconductor material for producing single crystals having predetermined electrical characteristics.

Active impurities are classified as either donors, such as antimony, arsenic, bismuth, and phosphorous, or acceptors, such as indium, gallium, thallium, boron, and aluminum. A region of semiconductor material containing an excess of donor impurities and yielding an excess of free electrons is considered to be an impurity-doped N-type region. An impurity-doped, P-type region is one containing an excess of acceptor impurities resulting in a deficit of electrons, or stated differently, an excess of holes. In other words, an N-type region is one characterized by electron conductivity, whereas a P-type region is one characterized by hole conductivity.

Presently it is thought that when a photon of radiant energy (either in the heat or infra-red, or in the light or visible portion of the electro-magnetic wave spectrum), strikes the surface of a semiconductor material, an electron and corresponding hole are produced as a pair. It is the flow of either these holes or electrons which produces conduction in the device which utilizes an N-type crystal as herein arbitrarily described. This conduction is mostly caused by holes which because of being surrounded by N-type impurity atoms are also called minority carriers. The generation rate, i.e., the time rate of creation of electron-hole pairs is a function of the number of photons which impinge upon the semiconductor crystal and which are not reflected at the surface of the crystal.

Unfortunately, after the electron-hole pairs are thus produced, there is a tendency for them to recombine. That is, the minority carrier has a tendency to recombine with an impurity atom to cause both the electron and hole to disappear. This recombination has been theorized to depend at least in part upon the following parameters: perfection of the semiconductor crystal, resistivity of the semiconductor crystal, surface condition of the semiconductor crystal, or surface-to-volume ratio of the semiconductor crystal.

In order to reduce the recombination rate it has been found desirable to place the collector junction, which is the point contact, close to that portion of the crystal at which the light or radiant energy impinges. When the point contact is too close to the location on the semiconductor crystal where the light impinges, both a production and a theoretical problem are encountered. If the crystal is made too small then in the manufacture of the photocell the pointed end of the whisker element may entirely miss striking the crystals so that there will in fact be no point contact made at all. Further, even though a small crystal permits a more efficient collection of carriers a larger crystal permits a more efficient collection of light. As an upper limit, the crystal cannot be made too large, else there will be too great a distance between the point contact position and the point or portion of the crystal wherein the photons impinge. Minority carriers will therefore have too great a distance to travel to the aforementioned collector point contact. As a result, since minority carriers tend to diffuse and recombine with impurity atoms in the crystal, very few will actually reach the point contact to produce any appreciable conduction. The presently accepted theory suggests that the greatest loss of minority carriers by recombination takes place at the surface of the crystal. Accordingly, the most advantageously designed crystal configuration, to reduce the degree of recombination, would call for the use of a spherically-shaped crystal. This is true because the ratio of surface-to-volume of a sphere is the smallest of any possible geometrical configuration.

It would thus appear that a photocell making use of a spherical semiconductor crystal with an associated point-contact would be the best solution to the aforementioned problem, namely, it would have the lowest possible recombination rate. This is true, but too many practical production problems are presented which preclude the use of spheres or near-spherical shapes as the semiconductor crystal body. Some of the difficulties encountered are involved in the forming of spheres to begin with and the subsequent inability to bring the point contact in pressure engagement with the sphere without slipping and scratching the surface thereof. Any imperfection of a crystalline solid, that is any deviation in the structure, even that caused by a scratch on the surface by a point contact, will greatly reduce the efficient operation of a device using such a point contact.

Many of the present art photocells which act either as rectifiers or photoelectric devices cannot be made small enough to be advantageously utilized in miniaturized packages or systems. A further disadvantage of many of the present art photocells is their perviousness to moisture. Still another inherent disadvantage to be encountered by all of the present art devices is that they are only sensitive to a directed or uni-directional source of light energy.

Further, many of the present devices have their use limited to either photoconductive or photoelectric operation. Most of the present art devices are also sensitive to shock and moisture.

Accordingly, it is therefore the primary object of this invention to provide an improved and exceedingly small point-contact photocell.

Another object of this invention is to provide a glass-fusion photocell which is hermetically sealed and therefore impervious to moisture.

A further object of this invention is to provide a photocell of extremely rugged construction, which will not be detrimentally affected by being subjected to a standard drop test, such as a fall from a height of 30 inches onto a maple floor.

Still another object of this invention is to provide an improved photoconductive cell adapted to operate with a bias voltage connected across the electrodes to provide an output current which is representative of the radiant energy impinging upon the cell, with a minimum of residual change in the dark current.

Still another object of this invention is to provide a photocell which has 360 degrees angular sensitivity about its axis.

A still further object of this invention is to provide a photocell which has a sensiitvity which is inherently adjustable.

A still further object of this invention is to provide an improved photocell which is adapted to operate with a source of alternating current connected across the electrodes to provide a rectified output voltage in response to radiant energy impinging upon the cell.

In the present invention a small region adjacent the point contact of a semiconductor specimen of one conductivity type is converted to a semiconductor material of the other conductivity type by doping this region with atoms of an active impurity from the metallic conductive whisker element making a point contact engagement with the specimen. More particularly, a resilient whisker element including an active impurity of one type is pressed in contact against an intrinsic or doped semiconductor crystal including an active impurity of the other type, and an electrical-forming current is passed through the whisker and crystal to produce a doped region, including an excess of atoms of said one type of active impurity in the portion of the crystal adjacent the point contact, and thereby changing the adjacent region to the opposite conductivity type.

According to one embodiment of the present invention, a whisker element containing indium is utilized for establishing a doped P-type region in a doped N-type germanium crystal specimen. In this embodiment the indium may be plated on a conventional resilient whisker of a suitable metal prior to use in a semiconductor device, or the indium may be fused into the adjacent surface region of the N-type germanium crystal.

Another method for creating a region of opposite conductivity in the area adjacent the point contact is to provide a whisker which includes a resilient metallic material alloyed with an acceptor impurity, such as aluminum, gallium, or indium, for establishing such doped P-type region in the N-type semiconductor specimen.

The present invention makes use of a substantially cube-shaped crystal which for a given volume has a relatively low surface area, simultaneously allowing a direct contact between the crystal and the point contact without resulting in slippage between the point contact and the crystal during assembly causing an imperfection in the face of the crystal. The term "substantially cube-shaped" as used hereinafter also includes a cylindrical crystal having parallel upper an lower surfaces which has been exposed to an etching process which by virtue of its preferential nature reveals the cubical lattice of the semiconductor crystal material. This sometimes results in a crystal whose sides tend to assume a bulging cube configuration after the etching process even though it was initially a cylinder or a sphere. It has been found by laboratory experimentation that a preferred size for such a crystal bearing in mind the previously explained upper and lower limits as to size and shape, and further assuming optimum values of low surface recombination velocity and low bulk recombination is approximately a cube whose edges measure between 0.1 and 2.0 millimeters.

In many of the prior art photocells the problem of recombination was recognized, but the solution therein taught was to focus the light at a point directed at the point contact thus considerably reducing the distance that the minority carriers need travel to the point contact. This practice has been found for many purposes to be undesirable because adjacent the point where the whisker makes contact with the crystal a minute junction is created during the forming operation. In case the device is biased to provide photoconductive operation a large potential gradient is established at this junction. The region where this large potential gradient appears at the surface is very susceptible to contamination by trace impurities, and these impurities in turn are semi-permanently affected by light. This semi-permanent effect may noticeably alter the dark current of the photocell for prolonged periods ranging to hours. Of course this reduces the reliability of such devices. To sum up, the reduction in reliability of a device such as a biased photoconducting cell is due to a residual change in dark current after illumination.

In the case of the semiconductor cube this effect is eliminated since the light impinges on the sides of the cube while the miniature junction with its large potential gradient is in the "shade." This is due to the fact that the region where the whisker impinges is only exposed to a small amount of glancing radiation due to the angle the impinging light makes therewith.

In accordance with a preferred embodiment of the present invention there is provided a semiconductor crystal, a resilient whisker element engaging one surface of the crystals, and a hollow, hermetically-sealed, vitreous envelope incasing the point contact and crystal, the crystal preferably having a cubical shape. The vitreous envelope is made transparent to radiant energy so that any such energy will not thereby be impeded from impinging upon the surface or surfaces of the incased germanium crystal at which it is directed.

The novel features which are believed to be characteristic of the invention both as to its organization and method of operation, together with further objects and advantages thereof, will be better understood from the following description considered in connection with accompanying drawings in which several embodiments of the invention are illustrated by way of example. It is to be expressly understood, however, that the drawings are for the purposes of illustration and example only, and are not intended as a definition of the limits of the invention.

In the accompanying drawings:

Fig. 1*a* is a graph showing the energy levels in a germanium crystal;

Fig. 1*b* is a graph indicating the energy levels and charge carriers present when impurities are added to a germanium crystal:

Fig. 1*c* is a graph showing the conditions which obtain when a relatively abrupt internal junction exists between N- and P-type materials.

Figure 4A:
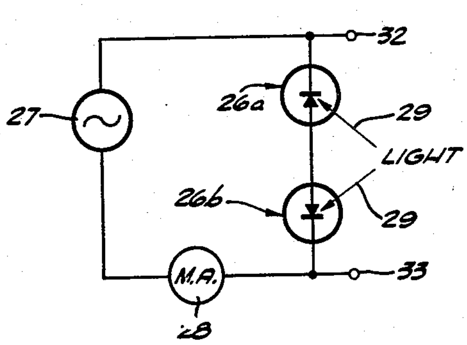

Fig. 4*a* is a circuit diagram of one embodiment of the photocell wherein it is biased by an alternating current.

Figure 4B:
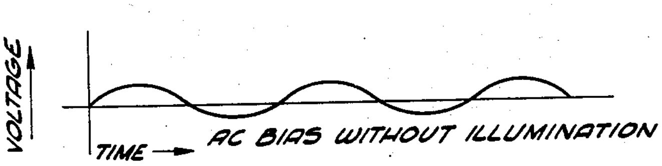

Fig. 4*b* is a graph showing, as a function of time, the voltage developed across the electrodes of the photocell of Fig. 4*a* when such photocell is not illuminated.

Figure 4C:
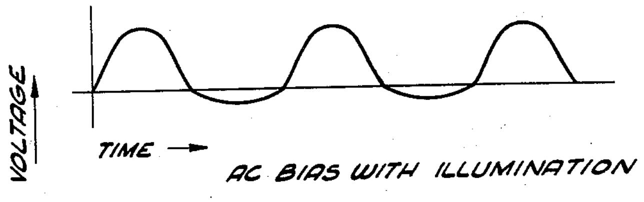

Fig. 4*c* is a graph showing, as a function of time, the voltage developed across the photocell of Fig. 4*a* when the photocell is illuminated.

Figure 5A:
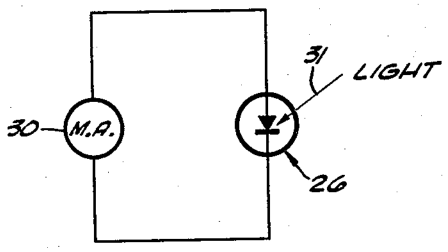

Fig. 5*a* is a circuit diagram of another embodiment of the photocell utilized as a photoelectric generator without a biasing voltage.

Figure 5B:
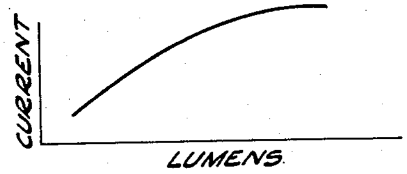

Fig. 5*b* is a graph showing, as a function of luminosity, the current developed by the photocell connected as shown in Fig. 5*a*.

Figures 6A, 6B, 7:
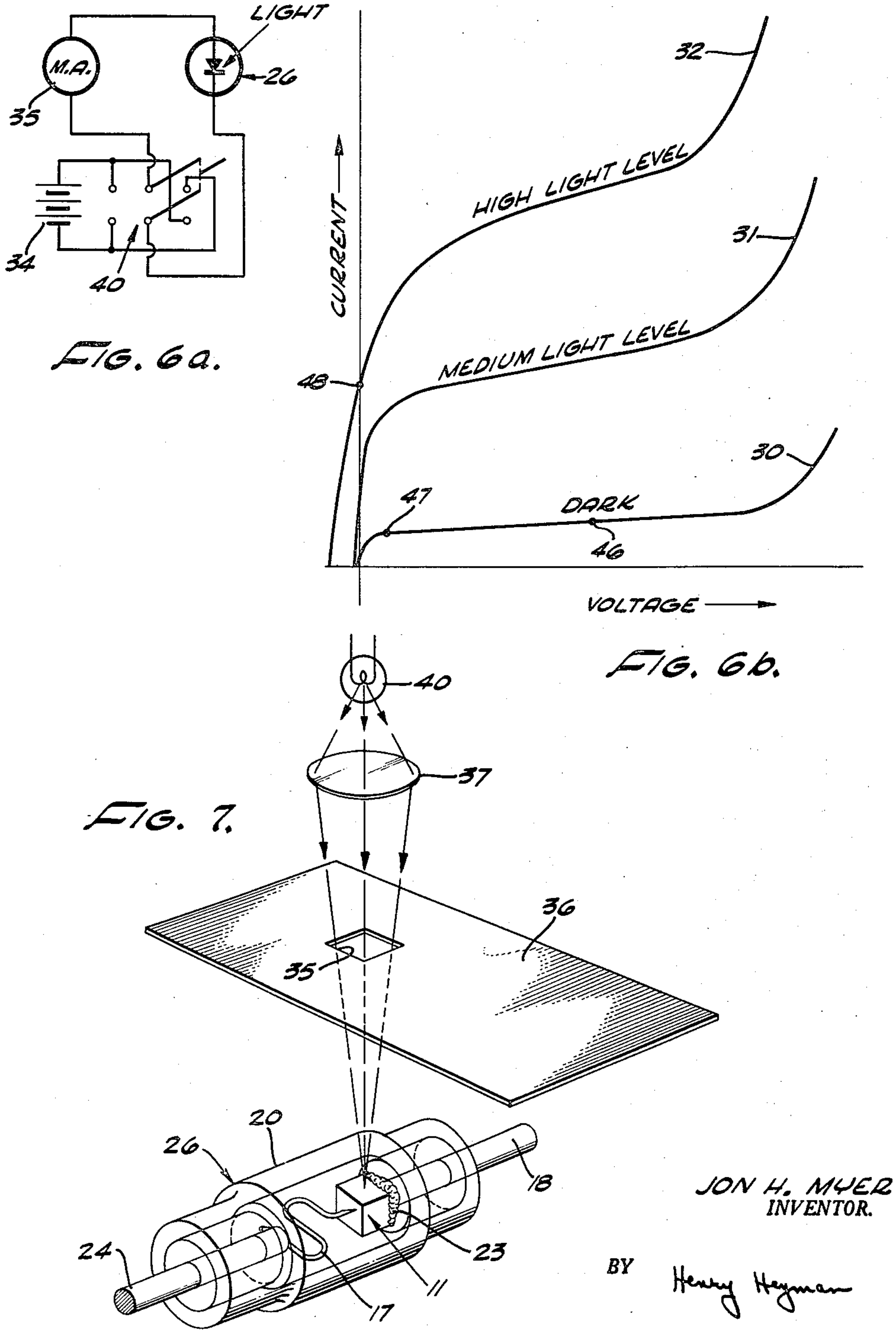

Fig. 6*a* is a circuit diagram showing a D.C. biased photocell.

Fig. 6*b* is a graph showing current as a function of applied bias voltage for the circuit illustrated in Fig. 6*a* under three different conditions of illumination.

Figure 2:
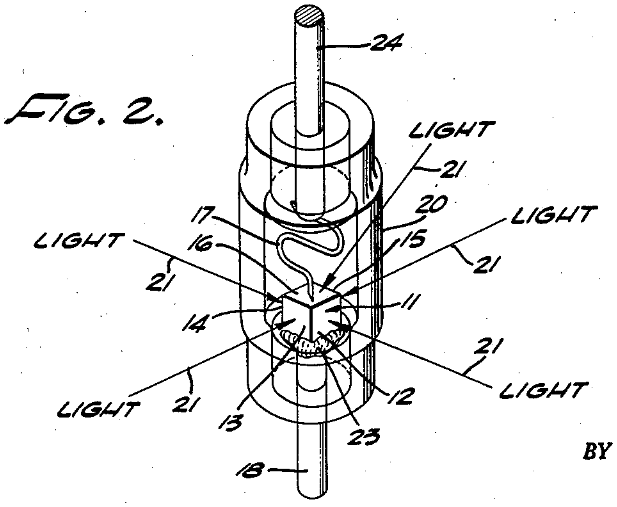
Fig. 2 is an enlarged isometric view showing the preferred embodiment of the photocell of the present invention encapsulated in a vitreous envelope and hermetically sealed therein.

Fig. 7 is an isometric view of the photocell of Fig. 2 showing how it may be used to indicate the presence of a hole in a punched hole card.

Figure 8A:
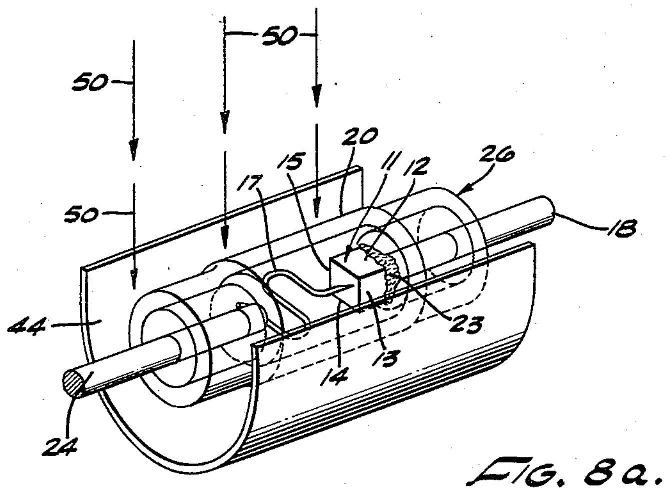

Fig. 8*a* is an isometric view of the photocell of Fig. 2 utilized with a half-cylinder reflector.

Figure 8B:
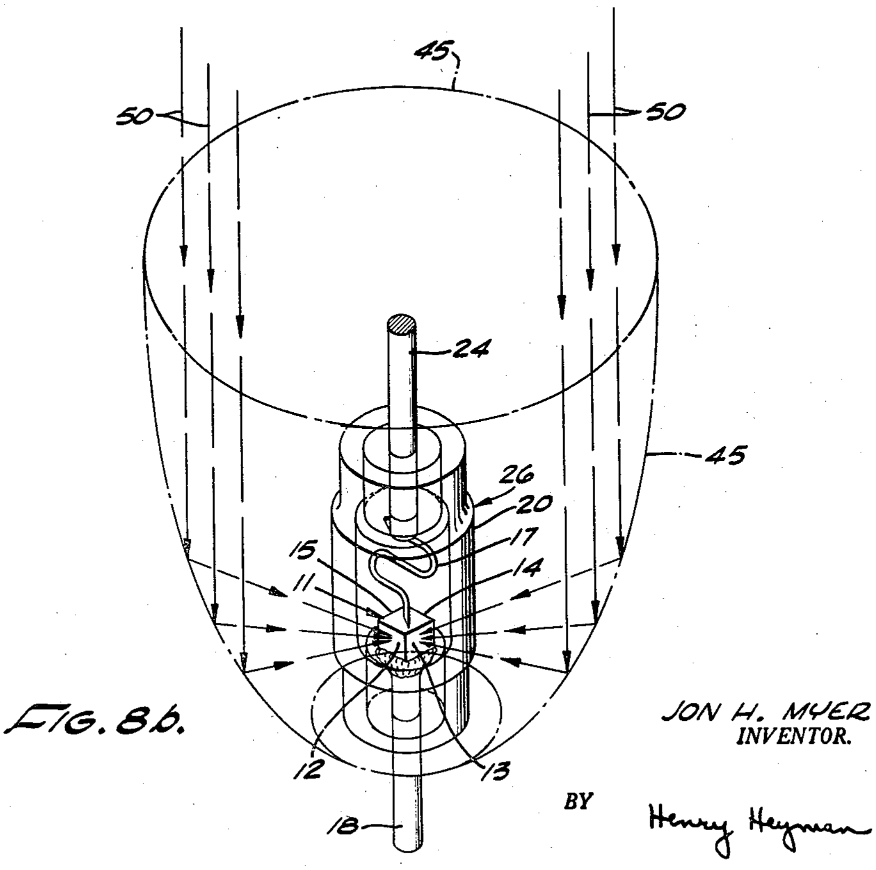

Fig. 8*b* is an isometric view of the photocell of Fig. 2 utilized with a paraboloid reflector.

Fig. 8*c* is an isometric view of the photocell of Fig. 2 having a spherical lens attached thereto.

Fig. 8*d* is an isometric view of the photocell of Fig. 2 having a cylindrical lens attached thereto.

Fig. 9 is a cross-section view of another embodiment of the photocell of the present invention wherein the crystal is tilted within the vitreous envelope, and Fig. 10 is an isometric view of a modification of the present invention wherein the crystal is supported at opposite points within the vitreous envelope.

For the purpose of clarity, the invention will be discussed in connection with point-contact, semiconductor photocells in which the monatomic semiconductor crystal is N-type germanium and the point contact is doped with a P-type active impurity. It is to be expressly understood, however, that the invention is equally applicable to the utilization of a P-type germanium crystal having a point contact doped with an N-type active impurity, or with any other type semiconductor, showing suitable light sensitivity, such as N- or P-type silicon, N- or P-type silicon-germanium alloy and other crystals hereinbefore mentioned, as well as larger area junctions instead of the whisker point contact.

Figure 1A:
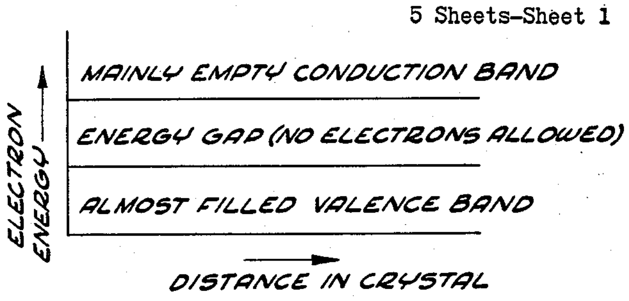
Figure 1B:
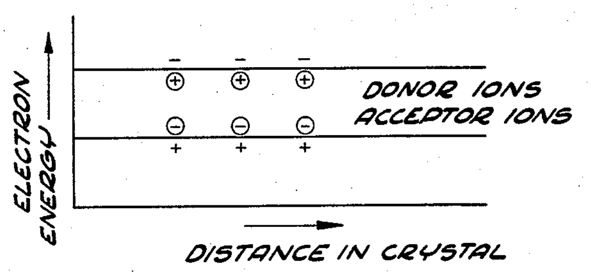
Figure 1C:
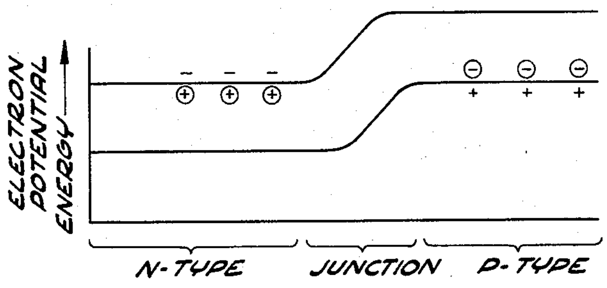

Referring now to the drawings, wherein like reference characters designate like parts throughout the various figures there are shown in Figs. 1*a*, 1*b*, and 1*c* graphs illustrating the physical phenomena which explain the operation of semiconductor photocells.

It may be taken as axiomatic that a periodical array of fixed atomic charges produces a series of bands of energy levels in which the associated electrons may move. Fig. 1*a* illustrates this phenomenon diagrammatically for a single crystal of germanium. Three bands are shown; the upper band being the conduction band, the middle band called the energy gap or forbidden band, and the lower band being called the valence band.

After the germanium has been completely refined, controlled amounts of donor or acceptor impurities may be introduced into the germanium. A single N-type germanium crystal is then grown. The energy level diagram will then appear for this single crystal of germanium, as shown in Fig. 1*b*. Therein the donors and acceptors are assumed to be completely ionized.

As indicated in Fig. 1*b*, the energy levels of the donor atoms indicated by a cross in a circle lie near the conduction band and the energy levels of the acceptor atoms represented by a minus sign in a circle lie near the almost-filled valence band. Whenever the number of donor ions exceeds the number of acceptor ions electrical conduction in the crystal will be mainly by the excess electrons represented as minus signs without a circle in the conduction band in Fig. 1*b*. If the number of acceptor ions exceeds the number of donor ions conduction will mainly be due to the positive holes represented as plus signs without a circle in Fig. 1*b* created in the otherwise filled valence band of electrons. The charged impurity ions, (donors and acceptors) are fixed in position in the crystal and are not free to move.

A single crystal of germanium which contains a relatively abrupt junction between N- and P-type material exhibits rectifying properties. This is shown diagrammatically in Fig. 1C. In this diagram electrons like to flow "downhill" to regions of lower potential energy (more positive) and holes like to flow "uphill" like air bubbles in a liquid. The area wherein there exists an N–P junction exhibits the property that any potential applied across the crystal will appear mainly across this junction region. If the N region, shown on the left, is made positive, the electrons would like to flow from right to left, "down" the junction hill. But, there are few electrons on the right to flow downhill and few holes on the left to flow uphill, thus little current flow can result. This is termed the direction of difficult current flow or the "reverse" direction. It is the direction in which a photocell is biased. If light falls in the vicinity of the junction, i.e., on the N-type side of the junction, electron-hole pairs will be generated in the N-type crystal. While the excess electrons thus generated will be added to the existing excess electrons, the holes will be swept toward the right, resulting in a photo current.

Reference is now made to Fig. 2 wherein there is shown one embodiment of a photocell according to this invention. The photocell is shown as a completed package, being incased within a vitreous or glass envelope 20. A complete description of this envelope and its method of manufacture may be found in U.S. Patent 2,694,168, entitled "Glass-Sealed Semiconductor Crystal Device," by H. Q. North et al., issued November 9, 1954. As illustrated in Fig. 2, radiant energy directed at the photocell is received by a crystal 11 from a light source indicated by arrows 21. In case the photocell is operated with a bias the light received on top crystal surface 16 is effective, or alternatively light may be received on crystal surfaces 12, 13, 14, and 15. In the case of photoelectric or photovoltaic operation it is permissible to illuminate only the upper surface 16 in the vicinity of a whisker element 17 for maximum sensitivity, whisker element 17 being substantially S-shaped and of a resilient metal. Crystal 11 preferably has the shape of a cube as shown.

Figure 3:
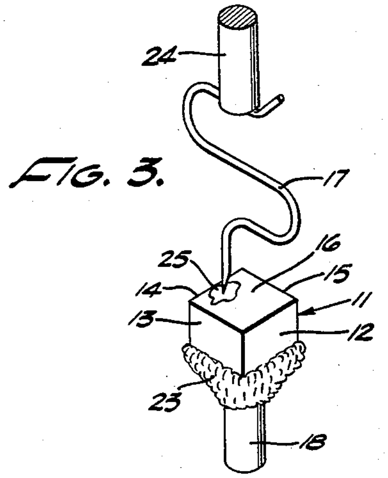
Fig. 3 is an isometric view showing in detail the elements incased in the vitreous envelope shown in Fig. 2.

In Fig. 3 there is shown an isometric view of the photocell illustrated in Fig. 1 without incasing glass envelope 20. As previously mentioned the invention will hereafter be disclosed in connection with a point-contact semiconductor device in which N-type germanium is the material of crystal 11, it being expressly understood, however, that the invention is equally applicable to the utilization of P-type germanium or any other semiconductor material showing suitable light sensitivity as a photo-resistive or photovoltaic detector. Crystal 11 is connected to its base electrode 18 which may be any suitable metallic conductor or wire in any conventional manner known to the art which may or may not produce an ohmic connection, depending upon the ultimately anticipated utilization of the device as will hereinafter be explained. If an ohmic connection is desired, the bottom surface of crystal 11 is preferably prepared by grinding and plating and other steps conventional to the art, before the electrode 18 is connected to crystal 11 by gold paste or any other suitable compound or alloy as for example, solder.

Whisker 17 is preferably spot-welded at one end thereof to its electrode 24, which may be of the same material as base electrode 18. The opposite, or pointed end of whisker 17 is positioned in pressure engagement with the upper surface 16 of crystal 11, thus establishing a point contact between crystal 11 and whisker 17.

As described in copending U.S. Patent application Serial No. 306,014, now Patent No. 2,818,536 for "Point-Contact Semiconductor Devices and Methods of Making Same," by Justice N. Carman, Jr., and Elmo E. Maiden, filed August 23, 1952, whisker 17 may be composed of a resilient metal, preferably formed to have an S configuration which imparts greater spring-like characteristics or resilience to the whisker. Although whisker 17 is shown throughout the drawings to be substantially S-shaped, it is to be expressly understood that the whisker element may have any of the conventional configurations known to the art.

Whisker 17 includes or is doped with an active impurity of the P- or acceptor-type. The specific impurities which may be utilized herein have previously been mentioned.

During the forming operation as described in the above-referred-to copending application and others generally known to the semiconductor art, a region or area 25 of crystal 11 adjacent whisker 17 will be converted from N-type germanium to a region of acceptor impurity-doped P-type germanium.

It should be noted that crystal 11 as illustrated in Fig. 3 will often not necessarily make contact with the exact center of surface 16 of crystal 11 due to the inherent imperfection of the "forming" apparatus. This apparent disadvantage is, however, often a desirable result, for a photocell so constructed will have inherent directional sensitivity. Obviously radiant energy impinging upon a side of the cube 11 closest to whisker 17 will result in a greater conduction effect than that produced by radiant energy impinging upon the other surfaces. This is a result of the smaller distance the generated minority carriers have to traverse from such a surface close to the whisker with a corresponding smaller chance for loss by recombination on the way.

On the other hand, if whisker 17 does make contact at the exact center of surface 16 of crystal 11 equal omni-directional sensitivity for photocell 26 will result.

In Fig. 4a two photocells 26a and 26b are connected in series back-to-back, as shown, and are collectively biased by A.C. source 27. A meter 28 is connected in series with source 27, photocells 26a and 26b, and may be a D.C. ammeter which is only sensitive to D.C. A light source indicated by arrow 29 emits radiant energy upon either of the two photocells which causes photons to impinge upon the germanium crystal of either of the photocells.

Fig. 4b graphically illustrates the voltage developed across output terminals 32 and 33 in the circuit of Fig. 4a, as a function of time, when no light energy is received by either photocell 26a or 26b. As is indicated in Fig. 4b the current generated by the A.C. source 27 shown in Fig. 4a is effectively blocked by the two photocells 26a and 26b connected back-to-back. The small residual dark current passed by both photocells appears as a small symmetrical A.C. current shown in Fig. 4b. The D.C. ammeter 28 is not responsive to such a current. If, however, light or other radiant energy within the range of sensitivity of photocells 26a and 26b is directed at one of the cells the resulting voltage developed across terminals 32 and 33 will be as shown in Fig. 4c. As therein indicated, the positive half cycle only of the A.C. voltage generated by source 27 appears as the output of the photocells 26a and 26b. It is thus apparent that the photocell of the present invention possesses photo-rectifying properties which are variable, being proportional to the illumination directed at the device. At the same time this circuit effectively eliminates the dark current passed by the cells and permits effective compensation of ambient illumination.

Fig. 5a depicts an arrangement whereby photocell 26 is utilized as a photo-generative device. A meter 30 is connected in series with photocell 26 which indicates the current generated by photocell 26 in response to the intensity of radiant energy generated by a light source represented by arrow 31 impinging upon the surfaces of the crystal. The graph in Fig. 5b shows the curve representing the electric current produced as a function of light intensity or lumens and measured by meter 30 for an arrangement typified by that presented in Fig. 5a.

While an electrical contact as opposed to a rectifying contact is required at the bottom surface of the crystal for the photocell 26 shown in Fig. 5a, such contact need not necessarily be a good ohmic contact. The provision of such a contact will tend somewhat to reduce the forward characteristics of the device but there will be a large gain in sensitivity, since an ohmic contact by its nature has a very high recombination rate for minority carriers injected by light. Also production processes will be greatly simplified by the elimination of ohmic contact preparation requirements. The crystal is therefore mounted for photoelectric use directly with gold paste 23 as illustrated in Fig. 3, or any other suitable mounting compound or alloy without a necessarily good ohmic contact thereby resulting. It might be mentioned here that this procedure effectively results in the production of an inefficient P-type junction, in addition to the one established during the forming process between crystal 11 and area 25 as previously indicated with respect to Fig. 3. A laboratory proof of the existence of such second junction at the bottom surface of the crystal which acts as a collector of carriers injected by the light in the vicinity thereof is as follows. To this end a low-resistance, high-sensitivity ammeter is connected in series with an unbiased photocell. If the crystal is now illuminated with a spot of light in the vicinity of the whisker, the meter needle will deflect in one direction, while the illumination in the vicinity of the back contact will result in a reversal of the meter needle deflection.

This second P–N junction formed at the bottom surface will have no appreciable effect when the photocell 26 is back-biased by D.C. source 34 shown in Fig. 6a. In this application of photocell 26 a D.C. meter 35 is placed in series with the photocell to measure the current flow therethrough. In Fig. 6a D.C. meter 35 is connected in series with D.C. source 34 and photocell 26 through a double-pole, double-thrown switch 40. The switch 40 is provided to permit the photocell 26 to be biased by source 34 in either the forward or back direction. The reason for this second junction being externally undiscernible in the usual D.C. back-biased arrangement for the crystal 11, is that under these operating conditions the second junction is effectively biased in the forward direction. Of course the resultant low recombination rate taking place at the bottom surface, not shown, due to the elimination of the ohmic contact contributes to an increase in sensitivity.

The graph of Fig. 6b indicates the relative values and characteristic curves of current as a function of voltage at three different levels of light intensity being received by the crystal of photocell 26. Curve 30 shows that the dark current at the value of voltage 46 is only slightly higher than that at point 47, while the impressed potential across cell 26 has been increased 50-fold.

Curve 31 indicates the current-voltage relationship for intermediate illumination. Curve 32 is a higher light intensity curve for current versus voltage with voltage at point 48 showing the photogenerator or photovoltaic effect described previously.

In Fig. 7 there is shown one application of the photocell 26 disclosed in the present invention whereby it is used to discern the occurrence of a hole 35 in a standard punched-hole card 36 employed in modern electronic computers. While it is true that infrared light will pass through card 36, even where no hole exists, the light will be scattered by the paper. On the other hand, when the light beam from source 40 focused by lens 37 appears at a portion of card 36 wherein a hole 35 is punched out the light beam passes through unimpeded, i.e., it is not scattered. As a result of this phenomenon, it is at once apparent that photocell 26 when so used can easily distinguish the existence of a hole from an opaque portion of card 36. This is possible because the output of photocell 26 will vary with the light intensity impinging upon its crystal 11 as previously explained. This variation is caused by the difference between the focused light intensity and the scattered light intensity.

Photocell 26 may be used also in another specialized application with either a P- or N-type germanium gold-doped crystal for use in the far infrared region. Alternatively cobalt or iron may be used as the doping agent for the crystal instead of gold. The use of an N- or P-type germanium photocell without the addition of any of the above doping agents results in a device having a spectral response which is effectively sensitive only to radiant energy up to a wave length of approximately 2 microns while the gold- or iron-doped device is sensitive to greater wave lengths.

The addition of these doping agents extends the sensitive region far into the infrared region according to the physical phenomena described in an article by Roger Newman, entitled "Photoconductivity in Gold-Germanium Alloys," in Physical Review dated April 15, 1954, pp. 278–285.

Fig. 8*a* illustrates how a half-cylindrical reflecting surface 44 may be advantageously employed with the present invention to direct received radiant energy from a source indicated by arrow 50 in a controlled manner, at photocell 26, thus utilizing all four sensitive surfaces 12, 13, 14, and 15 of crystal 11.

Alternatively a paraboloid-shaped reflector 45 presented in Fig. 8*b* illustrates another manner for directing light from a source indicated by arrow 50 to the four surfaces 12, 13, 14, and 15 of the photocell 26. Herein again all four sensitive surfaces of the crystal are utilized.

Referring now to Fig. 8*c* therein is shown another embodiment of the present invention. Basically, therein photocell 26, incased in glass envelope 20 has affixed to it a spherically-shaped lens or bead 38 of suitable index of refraction at a point on the envelope 20 which is opposite the region of maximum sensitivity of the crystal 11 herein arbitrarily designated surface 15. The word affixed is intended to include either temporary or permanent attachment of bead 38 to envelope 10. Temporary attachment may include the use of a simple, mechanical clip.

By a suitable index of refraction it is meant that value which will cause any light directed at the lens to continue therethrough finally impinging upon crystal 11, instead of possibly being reflected back out of the lens away from the crystal. Bead 38 may be made integral with glass envelope 10 by being permanently affixed thereto by means of cement 39 whose index of refraction is substantially equal to that of the spherical lens. It has been found that the addition of this lens increases the directivity of the device, resulting in an increase of sensitivity up to 600 percent for light directed toward the spherical lens.

An alternative manner of increasing the sensitivity of photocell 26 is illustrated in Fig. 8*d*. A cylindrical lens 42 having a suitable refractive index is affixed as described above upon envelope 20 in a plane parallel to the axis of the device. Alternatively, cement 39 may be employed to mount the cylindrical lens 42 which should have a suitable index of refraction upon envelope 20. Here again the index of refraction of the cement if used is substantially equal to that of the cylindrical lens, it being often desirable to only temporarily attach lens 42. A cylindrical light source 51 is shown for this arrangement.

In Fig. 9 there is shown another embodiment of the present invention wherein the crystal element 11 is shown to be tilted with respect to base electrode 18, base electrode 18 still making contact with bottom surface 19 of crystal 11. In this embodiment of the invention light is directed at the area of the crystal where whisker element 17 makes contact therewith only as shown by arrow 50.

This device will show the greatest directional sensitivity as a photoelectric generator since the minority carriers have to cover an exceedingly short distance and will not recombine, while the residual detrimental effect due to the past history of photon excitation of crystal 11 will not appear in the photogenerator application.

While specific structure has been shown it should be apparent that many substitutions may be made without departing from the spirit of the invention, for example, the crystal element 11 may be supported upon electrode 18 upon one of its points 49, as shown in Fig. 10. The opposite point would then be electrically joined to electrode 24 through leaf-spring contact 52. This modification of the invention would present a greater surface area of the crystal 11 to impinging light, and permit alternate methods of creating the collecting P-N function as discussed hereinabove.

There has thus been disclosed a novel semiconductor photocell which may be alternatively utilized as either a photogenerative or photorectifier device which is extremely compact and rugged.

What is claimed as new is:

1. A semiconductor photocell comprising: a semiconductive crystal having a substantially cubical shape, with a doped P-type region located substantially at the center of a first surface of said crystal; a whisker element doped with an electrical-conductivity-type-determining impurity of an opposite type from that contained in the balance of said crystal and having one end thereof in the form of a point-contact welded to said first surface of said crystal at said doped P-type region; a first electrical conductor connected to the other end of said whisker element; a second electrical conductor bonded to a second surface of said crystal, said second surface being located opposite said first surface; a hollow envelope wholly incasing said crystal and said whisker element, and having fused hermetic seals with said first and second conductors for maintaining said conductors in their relative positions, said envelope having a vitreous transparent portion positioned with respect to said crystal for admitting radiant energy to the remaining four surfaces of said crystal which do not have electrical connections thereto, whereby said photocell when utilized as a photorectifier exhibits approximately omnidirectional sensitivity to radiant energy impinging upon said four remaining surfaces.

2. A photocell comprising a crystal of semiconductive material having a substantially cubical form, having located substantially at the center of a first surface of said crystal a doped region of an opposite type from that contained in the balance of said crystal; a whisker element making a point electrical contact to said first surface at said first region; a first electrical conductor connected to said whisker element; a second electrical conductor engaging a second surface of said crystal disposed opposite said first surface, each edge of said crystal having a length in the range 0.1 to 2.0 millimeters; and a hollow envelope wholly incasing said crystal body and said whisker element and having fused hermetic seals with said first and second conductors for maintaining said conductors in their relative positions, said envelope having a transparent portion positioned with respect to said crystal for admitting radiant energy to the remaining four surfaces of said crystal which do not have electrical connections thereto, whereby said photocell when utilized as a photoelectric device exhibits uniform omnidirectional sensitivity to radiation impinging upon said four remaining surfaces.

3. A photocell comprising: a semiconductor crystal having a substantially cubical form; a whisker element doped with an active electrical-conductivity-type-determining impurity of the opposite type from that contained in said crystal and having one end in the form of a point-contact in off-center contact with a first surface of said crystal and welded thereto; a doped region in said crystal disposed at the point where said whisker element makes contact with said crystal, said doped region being of the conductivity type of said active impurity; a first electrical conductor connected to the other end of said whisker element; a second electrical conductor engaging a second surface of said crystal located opposite said first surface, each edge of said crystal having a length in the range 0.1 to 2.0 millimeters; and a hollow moisture impervious envelope wholly incasing said crystal and said whisker element and having fused hermetic seals with said first and second electrical conductors for maintaining said conductors in their relative positions, said envelope having a transparent portion positioned with respect to said crystal for admitting radiant energy to the remaining four surfaces of said crystal which do not have electrical connections thereto, whereby said photocell when utilized as a photoelectric device exhibits asymmetrical sensitivity to radiation impinging upon said four remaining surfaces.

4. The photocell defined in claim 3 wherein said semiconductor crystal is silicon.

5. The photocell defined in claim 3 wherein said semiconductor crystal is a germanium-silicon alloy.

6. A semiconductor photocell comprising: a crystal body of semiconductive material having a substantially cubical shape, a doped region of an opposite type from that contained in the balance of said crystal body provided in said crystal and adjacent a first surface thereof; a whisker element doped with an impurity selected from the group consisting of donors and acceptors of the conductivity type of said doped region and having one end thereof in the form of a point-contact welded to said first surface at said doped region; a first electrical conductor connected to the other end of said whisker element; a second electrical conductor bonded to a second surface of said crystal opposite said first surface; a hollow moisture impervious envelope wholly incasing said crystal and said whisker element and having fused hermetic seals with said first and second conductors in their relative positions, said envelope having a transparent portion positioned with respect to said cubical crystal body for admitting radiant energy to the remaining four surfaces of said cubical crystal body which do not have electrical connections thereto; and a substantially spherical radiant energy transmitting bead affixed to said envelope at a point coincident with one of said remaining four surfaces of said cubical crystal whereby said photocell when utilized as a photoelectric device establishes a potential gradient between said first and second electrical conductors proportional to the intensity of radiant energy focused upon that surface of said crystal located in register with said spherical bead.

7. The photocell defined in claim 6 wherein said radiant energy transmitting bead is cylindrically shaped.

References Cited in the file of this patent

UNITED STATES PATENTS

| | | |
|---|---|---|
| 2,504,628 | Benzer | Apr. 18, 1950 |
| 2,586,609 | Burke | Feb. 9, 1952 |
| 2,640,901 | Kinman | June 2, 1953 |
| 2,677,106 | Haynes et al. | Apr. 27, 1954 |
| 2,691,736 | Haynes | Oct. 12, 1954 |
| 2,694,168 | North et al. | Nov. 9, 1954 |
| 2,733,390 | Scanlon | Jan. 21, 1956 |
| 2,735,919 | Shower | Feb. 21, 1956 |
| 2,818,536 | Carman et al. | Dec. 31, 1957 |